US008387035B2

(12) United States Patent
Martin (10) Patent No.: US 8,387,035 B2
(45) Date of Patent: *Feb. 26, 2013

(54) PINNING INTERNAL SLACK NODES TO IMPROVE INSTRUCTION SCHEDULING (75) Inventor: Allan Russell Martin, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 854 days.

This patent is subject to a terminal disclaimer.

(21) Appl. No.: 12/353,154

(22) Filed: Jan. 13, 2009

(65) Prior Publication Data

US 2009/0113184 A1 Apr. 30, 2009

Related U.S. Application Data

(63) Continuation of application No. 10/929,193, filed on Aug. 30, 2004, now Pat. No. 7,493,611.

(51) Int. Cl.
  *G06F 9/45* (2006.01)
(52) U.S. Cl. ....................................... 717/159
(58) Field of Classification Search .................. None
  See application file for complete search history.

(56) References Cited

U.S. PATENT DOCUMENTS

| 5,202,993 | A | 4/1993 | Tarsy et al. |
| 5,291,397 | A | 3/1994 | Powell |
| 5,367,687 | A | 11/1994 | Tarsy et al. |
| 5,557,761 | A | 9/1996 | Chan et al. |
| 5,664,193 | A | 9/1997 | Tirumalai |
| 5,835,776 | A | 11/1998 | Tirumalai et al. |
| 5,867,711 | A | 2/1999 | Subramanian et al. |
| 5,941,983 | A | 8/1999 | Gupta et al. |
| 5,950,007 | A | 9/1999 | Nishiyama et al. |
| 6,026,240 | A | 2/2000 | Subramanian |
| 6,243,864 | B1 | 6/2001 | Odani et al. |
| 6,408,428 | B1 | 6/2002 | Schlansker et al. |
| 6,446,258 | B1 | 9/2002 | McKinsey et al. |
| 6,490,673 | B1 | 12/2002 | Heishi et al. |
| 6,711,717 | B2 * | 3/2004 | Nystrom et al. .............. 716/102 |
| 6,772,415 | B1 | 8/2004 | Danckaert |
| 6,820,223 | B2 | 11/2004 | Heishi et al. |
| 6,889,314 | B2 | 5/2005 | Samra et al. |
| 6,918,111 | B1 | 7/2005 | Damron et al. |
| 6,988,185 | B2 | 1/2006 | Stark, IV et al. |
| 7,007,271 | B2 | 2/2006 | Kumar et al. |
| 7,062,762 | B2 * | 6/2006 | Krishnamurthy et al. .... 717/156 |
| 7,069,555 | B1 | 6/2006 | Tzen |
| 7,076,638 | B2 | 7/2006 | Heishi et al. |

(Continued)

OTHER PUBLICATIONS

Muchnick, "Advanced Compiler Design and Implementation," 1997, pp. 548-568, Morgan Kaufman, San Francisco, California.

(Continued)

*Primary Examiner* — Wei Zhen
*Assistant Examiner* — Adam R Banes
(74) *Attorney, Agent, or Firm* — Yee & Associates, P.C.; Libby Z. Toub (57) ABSTRACT

A scheduling algorithm is provided for selecting the placement of instructions with internal slack into a schedule of instructions within a loop. The algorithm achieves this by pinning nodes with internal slack to corresponding nodes on the critical path of the code that have similar properties in terms of the data dependency graph, such as earliest time and latest time. The effect is that nodes with internal slack are more often optimally placed in the schedule, reducing the need for rotating registers or register copy instructions. The benefit of the present invention can primarily be seen when performing instruction scheduling or software pipelining on loop code, but can also apply to other forms of instruction scheduling when greater control of placement of nodes with internal slack is desired.

12 Claims, 4 Drawing Sheets

U.S. PATENT DOCUMENTS

| | | | |
|---|---|---|---|
| 7,197,747 B2 | 3/2007 | Ishizaki et al. | |
| 7,493,611 B2 | 2/2009 | Martin | |
| 7,617,495 B2 * | 11/2009 | Muthukumar et al. | 717/161 |
| 2003/0200540 A1 | 10/2003 | Kumar et al. | |
| 2004/0268335 A1 * | 12/2004 | Martin et al. | 717/161 |
| 2005/0216899 A1 * | 9/2005 | Muthukumar et al. | 717/151 |
| 2006/0048125 A1 | 3/2006 | Martin | |

OTHER PUBLICATIONS

Llosa et al., "Lifetime-Sensitive Modulo Scheduling in a Production Environment," IEEE Transactions on Computers, Mar. 2001, pp. 234-249, vol. 50, No. 3, IEEE Computer Society, Washington, DC.

Office Action dated Jan. 10, 2008 regarding U.S. Appl. No. 10/929,193, 12 pages.

Response to Office Action dated Apr. 7, 2008 regarding U.S. Appl. No. 10/929,193, 11 pages.

Notice of Allowance dated Jul. 3, 2008, regarding U.S. Appl. No. 10/929,193, 5 pages.

Supplemental Notice of Allowance dated Oct. 8, 2008, regarding U.S. Appl. No. 10/929,193, 3 pages.

* cited by examiner

FIG. 1

```
LABEL:
LOAD       r1
SHIFTL     r2=r1<<4
ADD        r3=r2+16
SHIFTL     r4=r3<<2
ADD        r5=r4+32
SHIFTL     r6=r5<<1
MULT       r7=r1*13
ADD        r8=r6+r7
STORE      r8
BRANCH LABEL
```

| NODE | EARLIEST TIME | LAST TIME | SLACK |
|---|---|---|---|
| 1 | 0 | 0 | 0 |
| 2 | 2 | 2 | 0 |
| 3 | 4 | 4 | 0 |
| 4 | 6 | 6 | 0 |
| 5 | 8 | 8 | 0 |
| 6 | 10 | 10 | 0 |
| 7 | 2 | 10 | 8 |
| 8 | 12 | 12 | 0 |
| 9 | 14 | 14 | 0 |

FIG. 5B

| NODE | CYCLE | NOTES |
|---|---|---|
| 1 | 0 | |
| 2 | 2 | |
| 3 | 4 | |
| 4 | 6 | |
| 5 | 8 | |
| 6 | 10 | |
| 7 | 3 | CANNOT GO IN CYCLE 2 DUE TO NODE 2 |
| 8 | 14 | CANNOT GO IN CYCLE 12, 13, DUE TO NODES 7, 3 |
| 9 | 16 | |

FIG. 6A

| NODE | CYCLE | NOTES |
|------|-------|-------|
| 1 | 0 | |
| 2 | 2 | |
| 3 | 4 | |
| 4 | 6 | |
| 5 | 8 | |
| 6 | 10 | |
| 7 | 7 | PINNED TO NODE 4, SO TRY TO PLACE IN CYCLE 6. CANNOT BE PLACED IN CYCLE 6, SO PLACE IN CYCLE 7 |
| 8 | 12 | |
| 9 | 14 | |

PINNING INTERNAL SLACK NODES TO IMPROVE INSTRUCTION SCHEDULING

This application is a continuation of application Ser. No. 10/929,193, filed Aug. 30, 2004, status allowed.

BACKGROUND OF THE INVENTION

1. Technical Field

The present invention relates to data processing and, in particular, to compiling and optimizing software code. Still more particularly, the present invention provides a method, apparatus, and program product for pinning internal slack nodes to improve instruction scheduling.

2. Description of Related Art

Instruction scheduling is a compiler optimization technique for reordering hardware instructions within a computer program to improve the speed that the program executes on a given computer hardware platform. Software pipelining is a compiler optimization technique for reordering hardware instructions within a given loop within a computer program being compiled to minimize the number of cycles required for each iteration of the loop. Specifically, software pipelining seeks to optimize code by overlapping execution of different iterations of the loop.

Modulo scheduling is a technique for performing software pipelining. For more information about software pipelining and modulo scheduling, see Muchnick, Stephen S, "Advanced Compiler Design and Implementation," Morgan Kaufman, 1997, pp. 548-568. More specifically, modulo scheduling is an algorithm that selects a likely minimum number of cycles that the loop will execute in, often called the minimum initiation interval (II) and places instructions into a schedule of that size, wrapping instructions around the end of the loop into the next iteration(s) until all instructions are scheduled. If the loop fails, modulo scheduling iteratively increases the number of cycles, or II, of the loop and tries to find a schedule that works.

Swing modulo scheduling (SMS) is a specific modulo scheduling algorithm designed to place instructions into the schedule in such a way that the schedule is nearly optimal in number of cycles, length of schedule, and registers used. For more information on swing modulo scheduling, see Llosa et al., "Lifetime-Sensitive Modulo Scheduling in a Production Environment," IEEE Transactions on Computers, vol. 50, no. 3, March 2001.

SMS comprises three steps. First, the SMS algorithm builds a data dependency graph (DDG) and performs analysis on the graph to calculate height, depth, earliest time, latest time, and slack of each node in the graph. Nodes in the graph correspond to instructions.

In the next step, the SMS algorithm orders the nodes in the graph. The ordering is performed based on the priority given to groups of nodes such that the ordering always grows out from a nucleus of nodes, rather than starting two groups of nodes and connecting them together. An important feature of this step is that the direction of the ordering works in both the forward and backward direction so that the nodes are added to the order that are both predecessors and successors of the nucleus of previously ordered nodes. When considering the first node, or when an independent section of the graph is finished, the next node to be ordered is selected from the pool of unordered nodes based on its priority using minimum earliest time for forward direction and maximum latest time for backward direction. Then, nodes that are predecessors and successors to the pool of nodes are added to the ordering such that whenever possible, nodes that are added only have predecessors or successors already ordered, not both. Pseudo code for the SMS algorithm can be found in Llosa et al., Id.

In the next step, the SMS algorithm schedules the nodes. This part of the algorithm is fairly straightforward. The algorithm examines the nodes in the order from the previous step and places each node as close as possible, while respecting scheduling latencies, to its predecessors or successors. Because the order can change direction freely between moving forward and backward, the scheduling step may be performed in the forward direction and the backward direction, placing nodes so that they are an appropriate number of cycles before successors or after predecessors.

SUMMARY OF THE INVENTION

The present invention provides a scheduling algorithm for selecting the placement of instructions with internal slack into a schedule of instructions within a loop. The algorithm achieves this by pinning nodes with internal slack to corresponding nodes on the critical path of the code that have similar properties in terms of the data dependency graph, such as earliest time and latest time. The effect is that nodes with internal slack are more often optimally placed in the schedule, reducing the need for rotating registers or register copy instructions. The benefit of the present invention can primarily be seen when performing instruction scheduling or software pipelining on loop code, but can also apply to other forms of instruction scheduling when greater control of placement of nodes with internal slack is desired.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
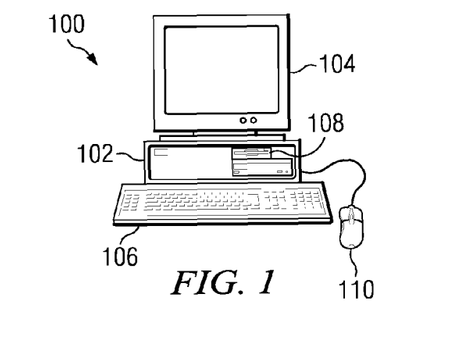
FIG. 1 is a pictorial representation of a data processing system in which the present invention may be implemented in accordance with a preferred embodiment of the present invention.
Figure 2:
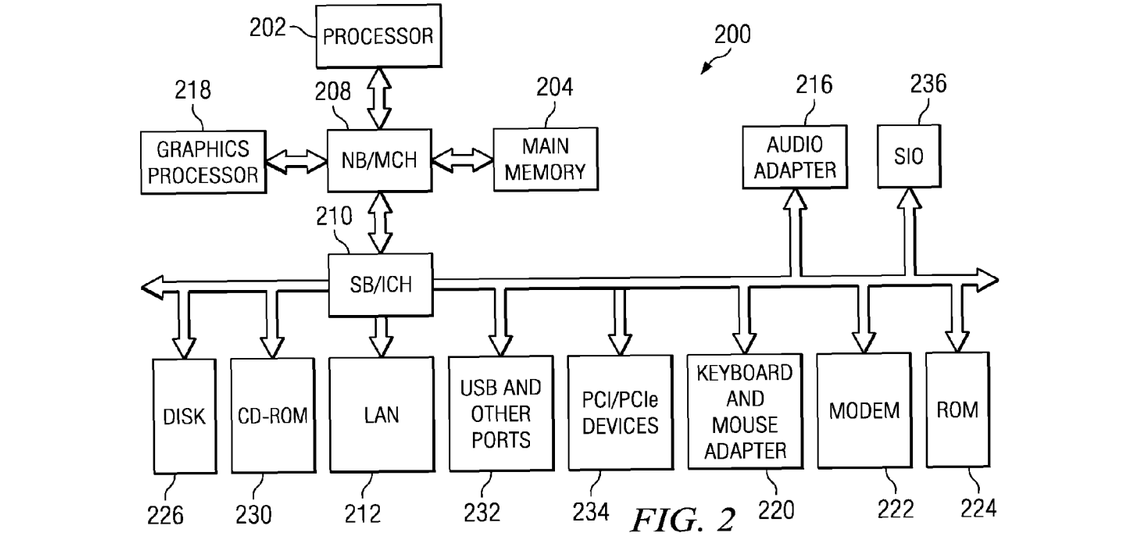
FIG. 2 a block diagram of a data processing system in which the present invention may be implemented.

The present invention provides a method, apparatus and computer program product for pinning internal slack nodes to improve instruction scheduling. The data processing device may be a stand-alone computing device or may be a distributed data processing system in which multiple computing devices are utilized to perform various aspects of the present invention. Therefore, the following FIGS. 1 and 2 are provided as exemplary diagrams of data processing environments in which the present invention may be implemented. It should be appreciated that FIGS. 1 and 2 are only exemplary and are not intended to assert or imply any limitation with regard to the environments in which the present invention may be implemented. Many modifications to the depicted environments may be made without departing from the spirit and scope of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

Computer 100 can be implemented using any suitable computer, such as an IBM eServer™ computer or IntelliStation® computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. In the depicted example, data processing system 200 employs a hub architecture including a north bridge and memory controller hub (MCH) 208 and a south bridge and input/output (I/O) controller hub (ICH) 210. Processor 202, main memory 204, and graphics processor 218 are connected to MCH 208. Graphics processor 218 may be connected to the MCH through an accelerated graphics port (AGP), for example.

In the depicted example, local area network (LAN) adapter 212, audio adapter 216, keyboard and mouse adapter 220, modem 222, read only memory (ROM) 224, hard disk drive (HDD) 226, CD-ROM driver 230, universal serial bus (USB) ports and other communications ports 232, and PCI/PCIe devices 234 may be connected to ICH 210. PCI/PCIe devices may include, for example, Ethernet adapters, add-in cards, PC cards for notebook computers, etc. PCI uses a cardbus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to ICH 210.

An operating system runs on processor 202 and is used to coordinate and provide control of various components within data processing system 200 in FIG. 2. The operating system may be a commercially available operating system such as Windows XP™, which is available from Microsoft Corporation. An object oriented programming system, such as Java™ programming system, may run in conjunction with the operating system and provides calls to the operating system from Java™ programs or applications executing on data processing system 200. "JAVA" is a trademark of Sun Microsystems, Inc. Instructions for the operating system, the object-oriented programming system, and applications or programs are located on storage devices, such as hard disk drive 226, and may be loaded into main memory 204 for execution by processor 202. The processes of the present invention are performed by processor 202 using computer implemented instructions, which may be located in a memory such as, for example, main memory 204, memory 224, or in one or more peripheral devices 226 and 230.

Those of ordinary skill in the art will appreciate that the hardware in FIG. 2 may vary depending on the implementation. Other internal hardware or peripheral devices, such as flash memory, equivalent non-volatile memory, or optical disk drives and the like, may be used in addition to or in place of the hardware depicted in FIG. 2. Also, the processes of the present invention may be applied to a multiprocessor data processing system.

The present invention provides a scheduling algorithm for selecting the placement of instructions with internal slack into a schedule of instructions within a loop. Slack is a property of nodes in a Data Dependence Graph (DDG) that represents how much flexibility is available in scheduling each node and is calculated by the difference between latest time and earliest time. A node with zero slack has no flexibility, so it can be said that it lies on the critical path.

Nodes that have a non-zero slack value fall into two categories. The first category describes chains of one or more nodes that are on part of the DDG that do not have a predecessor or do not have a successor, so that the chain attaches to the outside of the rest of the DDG. This kind of nodes is relatively easy to place into the schedule because they are not constrained by predecessors and successors. For the purposes of the present invention, these nodes are said to have external slack.

The second category of nodes that have slack are those that are part of a chain of one or more nodes that have both a predecessor and a successor that lie on the critical path. These nodes are more constrained than external slack nodes and may require special attention to ensure they are scheduled well. A node can be said to have internal slack if the node has non-zero slack and meets the critical path in both the forward and backward direction through the DDG. A node with internal slack may be scheduled anywhere between its predecessor and its successor, such that the latencies between them are not violated. Internal slack refers to the relative freedom that exists to schedule a node between its predecessors and its successors.

The algorithm achieves optimal placement by pinning nodes with internal slack to corresponding nodes on the critical path of the code that have similar properties in terms of the data dependency graph, such as earliest time and latest time. The effect is that nodes with internal slack are more often optimally placed in the schedule, reducing the need for rotating registers or register copy instructions.

Figure 3:
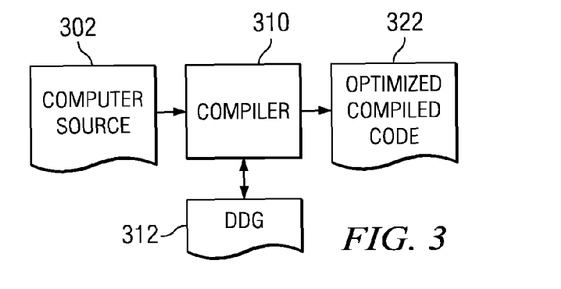
FIG. 3 is a block diagram of a compiler with instruction scheduling in accordance with an exemplary embodiment of the present invention.

FIG. 3 is a block diagram of a compiler with instruction scheduling in accordance with an exemplary embodiment of the present invention. Compiler 310 receives computer source code 302 for compilation. Compiler 310 converts source code 302 into machine code for execution and performs optimizations to improve performance of the code. In a preferred embodiment of the present invention, compiler 310 performs instruction scheduling to form optimized compiled code 322. Compiler 310 may also perform software pipelining.

First, compiler 310 compiles computer source 302 and builds DDG 312 for the compiled code. Then, compiler 310 analyzes DDG 312 to determine which nodes have internal slack. Once compiler 310 determines which nodes have internal slack, compiler 310 pins these nodes to nodes on the critical path that have similar DDG properties. The critical path may be the path with the greatest number of nodes or the path with the longest delay time. The DDG properties may include earliest time, latest time, or other properties computed from DDG 312.

An important point to note is that a node with internal slack has a relatively large amount of freedom to be placed in the schedule; therefore, it should be pinned to a node that has less freedom to be placed in the schedule to achieve the effect that the internal slack node will end up being in a desirable location. It is also important to note that it is beneficial that internal slack nodes are pinned to nodes on the critical path that lie on the same subgraph. If the critical path node lies on a separate subgraph, meaning there is no chain of dependencies connecting the internal slack node and the critical path node, it is not a good choice for pinning the internal slack node.

In one preferred embodiment of the present invention, compiler 310 determines the average of the earliest time and the latest time to find a suitable node to which to pin the internal slack node. For example, if the node with internal slack has an earliest time of six and a latest time of fourteen, then the average is ten. Thus, in this example, compiler 310 would look for a node on the critical path that has an average of earliest time and latest time close to ten.

Again, this can be implemented in various ways, but one method is to search through all critical path nodes in the same subgraph and select a corresponding node with the most similar average of earliest and latest time for each node with internal slack. However, it should be noted that if no critical path node has sufficiently similar properties in the graph, then the node should not be pinned. A threshold may be selected that defines how similar a critical path node must be. The internal slack node may be pinned to a critical path node only if the critical path node has properties that are similar to the internal slack node within the threshold.

Once a decision is made on pinning internal slack nodes, compiler 310 schedules the nodes in DDG 312. The SMS algorithm inherently favors nodes on the critical path over nodes that have substantial slack values, so critical path nodes with similar values of earliest and latest time will be ordered earlier than an internal slack node in the prioritized ordering. This minimizes the length of the critical path when executing, which often means faster execution and/or fewer register used. A critical path node that has one or more nodes pinned to it should be placed in the schedule before the node or nodes that are pinned to it. Then, a node that is pinned to a critical path node may be scheduled. The scheduling algorithm may be modified to place the pinned node as close as possible to the node to which it is pinned, as long as all delay constraints are observed. This gives the scheduler more information about where in the schedule the node can be optimally placed.

Figure 4:
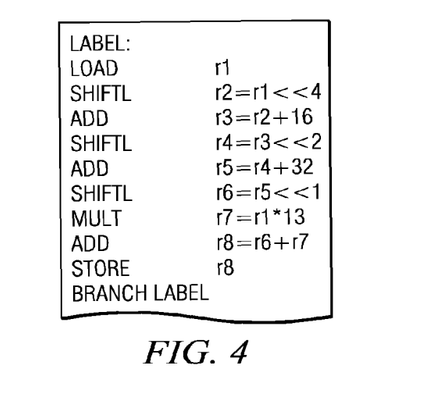
FIG. 4 illustrates an example portion of code in accordance with a preferred embodiment of the present invention.

FIG. 4 illustrates an example portion of code in accordance with a preferred embodiment of the present invention. In the depicted example, the present invention is implemented within the framework of swing modulo scheduling, because SMS is a flexible algorithm for software pipelining. However, the present invention may be implemented within the framework of any scheduling compiler optimization.

Consider a machine that executes one instruction per cycle, all dependent instructions having a delay of two cycles (issue to issue). Also consider that the machine does not have rotating registers. Register rotation is a feature that helps loop unrolling by shifting registers by one or more apparent positions. This allows iterative loops to access the same register(s) repeatedly. Each instance of the loop actually targets different physical registers, allowing them all to be in use at once.

Figure 5A:
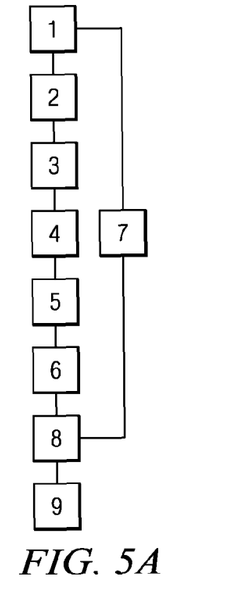
FIGS. 5A and 5B illustrate a data dependency graph and properties for the loop in accordance with an exemplary embodiment of the present invention.
Figure 5B:
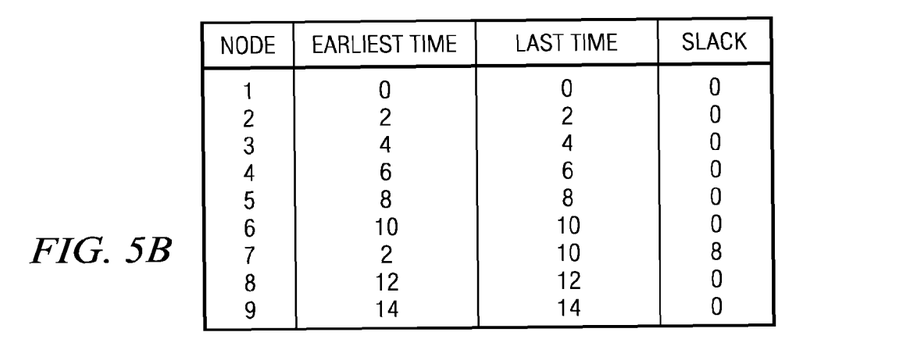

FIGS. 5A and 5B illustrate a data dependency graph and properties for the loop shown in FIG. 4 in accordance with an exemplary embodiment of the present invention. Once the DDG is built, the critical path of this loop consists of nodes 1, 2, 3, 4, 5, 6, 8, and 9, because these nodes have zero slack. Node 7 has a significant amount of slack, because it depends on node 1, while node 8 depends on it. Also, node 7 can be said to have internal slack, because it is part of the DDG that meets the critical path in both the forward and backward direction.

Figure 6A:
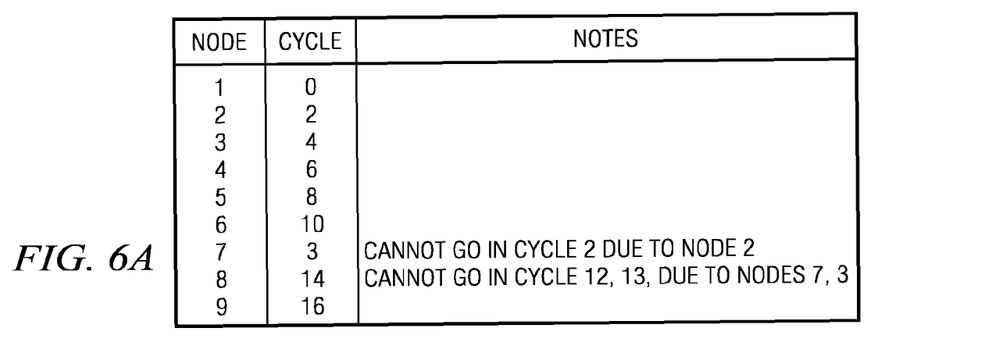
FIG. 6A illustrates a schedule for a loop according to swing modulo scheduling.
Figure 6B:
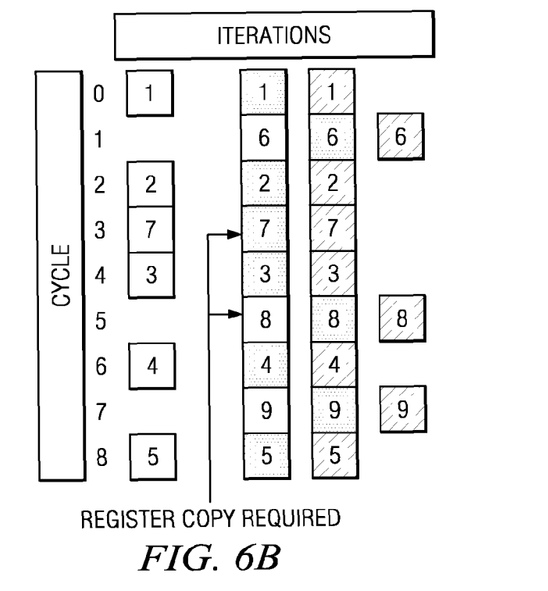
FIG. 6B illustrates three iterations of the loop according to the schedule in FIG. 6A.

If the loop shown in FIG. 4 were scheduled by the prior art SMS algorithm, the algorithm would select a minimum initiation interval of nine cycles due to resource constraints (nine instructions, one instruction per cycle). The algorithm may determine a prioritized ordering of 1, 2, 3, 4, 5, 6, 7, 8, 9. The algorithm may then generate a schedule with II=9 as shown in FIG. 6A. FIG. 6B illustrates three iterations of the loop according to the schedule in FIG. 6A. Note that all nodes are successfully scheduled, but node 7 is placed eleven cycles earlier than the dependent instruction node 8. This will require use of register copy instructions, because rotating registers are not available on the target processor. However, since all cycles have an instruction placed in them, register copy instructions cannot be placed into the schedule. Therefore, SMS will fail scheduling this loop in nine cycles.

In accordance with a preferred embodiment of the present invention, the modified algorithm pins the internal slack node to one of the nodes in the critical path. Using the average value of earliest time and latest time, node 7 has a value of 6. Based on this value, the algorithm chooses to pin node 7 to node 4, because node 4 has the closest value of the critical path nodes. The ordering of the nodes will be the same as the prior art SMS algorithm.

Figure 7A:
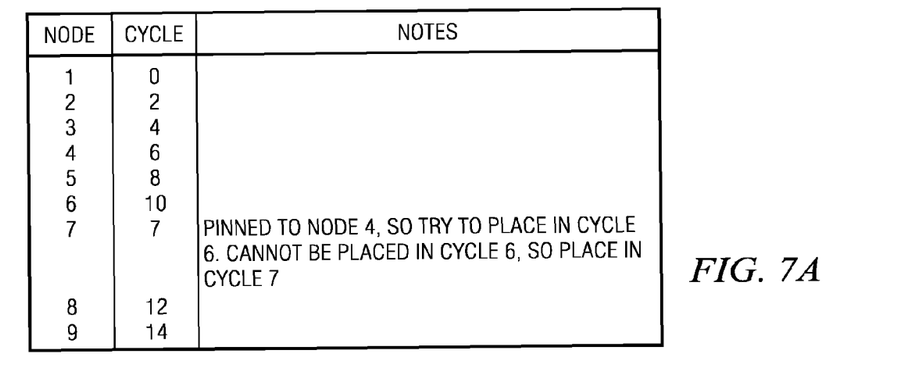
FIG. 7A illustrates a schedule of the example loop in accordance with a preferred embodiment of the present invention.
Figure 7B:
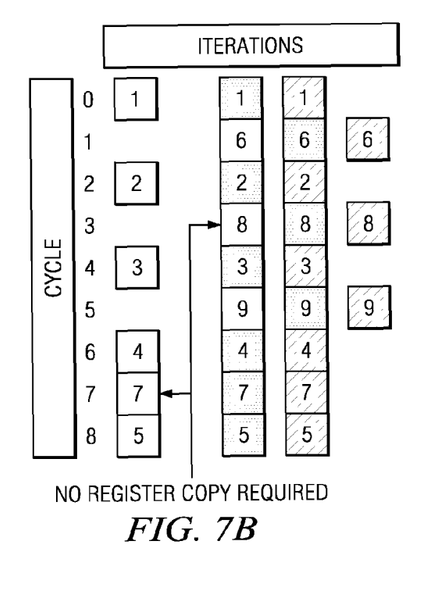
FIG. 7B illustrates three iterations of the loop according to the schedule in FIG. 7A.

FIG. 7A illustrates a schedule of the example loop in accordance with a preferred embodiment of the present invention. FIG. 7B illustrates three iterations of the loop according to the schedule in FIG. 7A. Note that the modified algorithm successfully schedules the loop in nine cycles. Node 7 is placed seven cycles after its predecessor, node 1. Node 7 is also placed five cycles before its successor, node 8. Also note that the critical path of this loop is scheduled from cycle 0 to cycle 14, which is the minimum possible duration. This schedule is optimal in terms of cycles and register usage.

Figure 8:
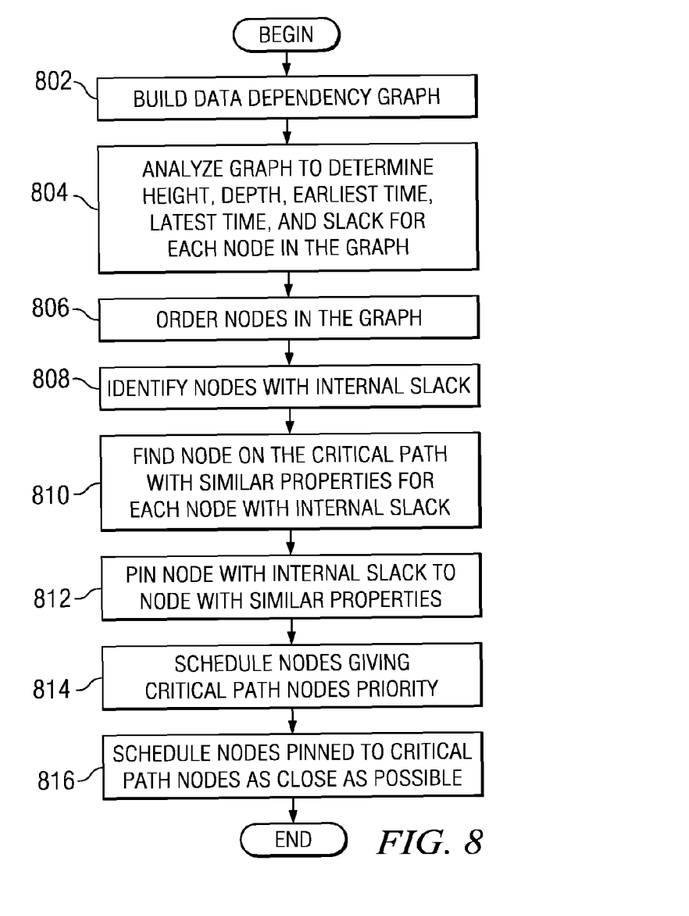
FIG. 8 is a flowchart illustrating the operation of a compiler performing a scheduling algorithm for a loop in accordance with an exemplary embodiment of the present invention.

FIG. 8 is a flowchart illustrating the operation of a compiler performing a scheduling algorithm for a loop in accordance with an exemplary embodiment of the present invention. Operation begins and the scheduling algorithm builds a data dependency graph (block 802). Then, the algorithm analyzes the graph to determine height, depth, earliest time, latest time, and slack for each node in the graph (block 804). The algorithm orders the nodes in the graph (block 806) and identifies nodes with internal slack (block 808).

Thereafter, the algorithm finds a node on the critical path with similar properties for each node with internal slack (block 810). The algorithm then pins each internal slack node to the corresponding critical path node (block 812). Next, the algorithm schedules the nodes giving the critical path nodes priority (block 814) and schedules the nodes pinned to the critical path nodes as close as possible to the nodes to which they are pinned (block 816). Thereafter, operation ends.

Figure 9:
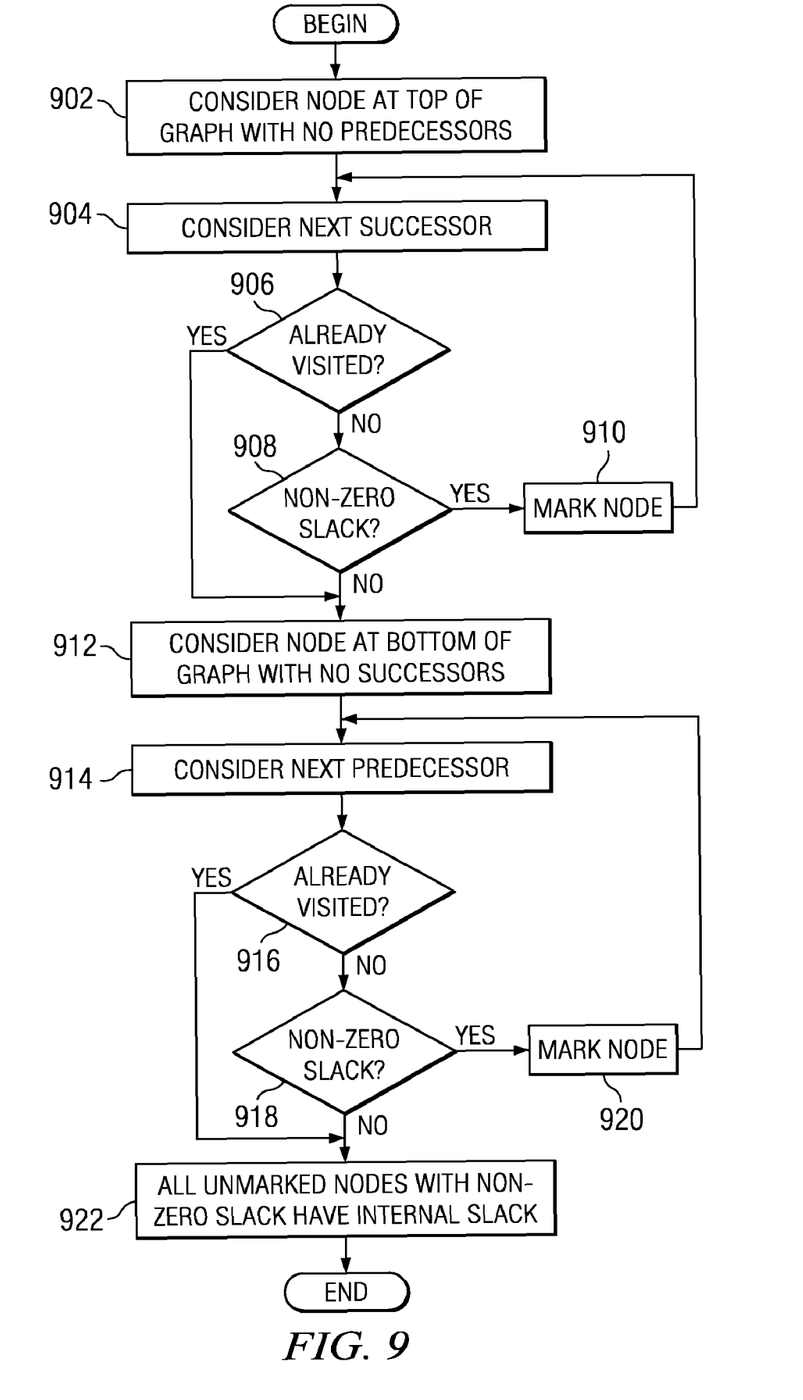
FIG. 9 is a flowchart illustrating the operation of identifying internal slack nodes in accordance with an exemplary embodiment of the present invention.

FIG. 9 is a flowchart illustrating the operation of identifying internal slack nodes in accordance with an exemplary embodiment of the present invention. Operation begins and two passes are performed to mark nodes that have slack, but whose slack is external to the critical path. This can be performed on the first pass by considering the node at the top of the graph with no predecessors that has non-zero slack (block 902). The algorithm then considers the next successor (block 904) and a determination is made as to whether the node has already been visited (block 906).

If the path has not been visited, a determination is made as to whether the node has non-zero slack (block 908). If the node has non-zero slack, then the node is marked (block 910) and operation returns to block 904 to consider the next successor.

If the node has already been visited in block 906 or has zero slack in block 908, operation begins the second pass. The algorithm considers the node at the bottom of the graph with no successors (block 912). The algorithm then considers the next predecessor (block 914) and a determination is made as to whether the node has already been visited (block 916). If the path has not been visited, a determination is made as to whether the node has non-zero slack (block 918). If the node has non-zero slack, then the node is marked (block 920) and operation returns to block 914 to consider the next predecessor.

If the node has already been visited in block 906 or has zero slack in block 908, all unmarked nodes with non-zero slack are considered to have internal slack (block 922) and operation ends.

Thus, the present invention solves the disadvantages of the prior art by providing a scheduling algorithm for selecting the placement of instructions with internal slack into a schedule of instructions within a loop. The algorithm achieves this by pinning nodes with internal slack to corresponding nodes on the critical path of the code that have similar properties in terms of the data dependency graph, such as earliest time and latest time. The effect is that nodes with internal slack are more often optimally placed in the schedule, reducing the need for rotating registers or register copy instructions.

The present invention is particularly beneficial when scheduling loops that have nodes with internal slack. This is a common scenario when loops have complex instruction sequences. The present invention allows instruction scheduling to produce schedules that are more often optimal in terms of numbers of cycles, register usage, and that avoid the need for register copy instructions. Also, the present invention can be implemented with only a very small increase in compilation time.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus for scheduling a set of instructions, the apparatus comprising:
    means for building a data dependency graph for the set of instructions, wherein a subset of the instructions form a critical path in the data dependency graph;
    means for identifying an internal slack node in the data dependency graph, wherein the internal slack node has internal slack;
    means for pinning the internal slack node to a critical path node in the critical path, wherein the critical path node has at least one property that is similar to the internal slack node, wherein the at least one property includes an average of an earliest time and a latest time; and
    means for scheduling the set of instructions such that the internal slack node is scheduled close to the critical path node.

2. The apparatus of claim 1, wherein the set of instructions is a loop.

3. The apparatus of claim 2, wherein the means for scheduling the set of instructions include means for performing software pipelining on the loop.

4. The apparatus of claim 1, further comprising: means for analyzing the data dependency graph to determine properties of nodes in the graph.

5. The apparatus of claim 4, wherein the properties include at least one of height, depth, earliest time, latest time, and slack.

6. The apparatus of claim 1, wherein the means for identifying an internal slack node include: means for marking nodes that have slack whose slack is external to the critical path; and means for identifying at least one unmarked node with slack.

7. A computer program product in a physical computer readable storage medium for scheduling a set of instructions, the computer program product comprising:
    instructions for building a data dependency graph for the set of instructions, wherein a subset of the instructions form a critical path in the data dependency graph;
    instructions for identifying an internal slack node in the data dependency graph, wherein the internal slack node has internal slack;
    instructions for pinning the internal slack node to a critical path node in the critical path, wherein the critical path node has at least one property that is similar to the internal slack node, wherein the at least one property includes an average of an earliest time and a latest time; and
    instructions for scheduling the set of instructions such that the internal slack node is scheduled close to the critical path node.

8. The computer program product of claim 7, wherein the set of instructions is a loop.

9. The computer program product of claim 8, wherein the instructions for scheduling the set of instructions include instructions for performing software pipelining on the loop.

10. The computer program product of claim 7, further comprising:
    instructions for analyzing the data dependency graph to determine properties of nodes in the graph.

11. The computer program product of claim 10, wherein the properties include at least one of height, depth, earliest time, latest time, and slack.

12. The computer program product of claim 7, wherein the instructions for identifying an internal slack node include: instructions for marking nodes that have slack whose slack is external to the critical path; and instructions for identifying at least one unmarked node with slack.

* * * * *